United States Patent
Pous et al.

(10) Patent No.: US 7,487,218 B2
(45) Date of Patent: *Feb. 3, 2009

(54) SYSTEM AND METHOD FOR SENDING ELECTRONIC MESSAGES BASED ON TIME ZONE INFORMATION

(76) Inventors: Robert T. Pous, 9600 Eagle Ridge Rd., Bethesda, MD (US) 20817; Thomas J. Fisher, 2006 Madrillon Creek Ct., Vienna, VA (US) 22182

(*) Notice: Subject to any disclaimer, the term of this patent is extended or adjusted under 35 U.S.C. 154(b) by 0 days.

This patent is subject to a terminal disclaimer.

(21) Appl. No.: 11/690,556

(22) Filed: Mar. 23, 2007

(65) Prior Publication Data

US 2007/0192425 A1 Aug. 16, 2007

Related U.S. Application Data

(63) Continuation of application No. 10/323,833, filed on Dec. 20, 2002, now Pat. No. 7,216,146.

(51) Int. Cl.
G06F 15/16 (2006.01)
G06F 15/173 (2006.01)
(52) U.S. Cl. ............... 709/206; 709/203; 709/224; 709/238; 709/242

(58) Field of Classification Search ............ 709/206, 709/203, 224, 238, 242; 370/230; 379/88.13; 725/47; 705/37
See application file for complete search history.

(56) References Cited

U.S. PATENT DOCUMENTS

| | | | |
|---|---|---|---|
| 6,724,723 B1 * | 4/2004 | Hamami | 370/230 |
| 6,724,732 B1 | 4/2004 | Abrams et al. | |
| 6,999,565 B1 * | 2/2006 | Delaney et al. | 379/88.13 |
| 2001/0032175 A1 * | 10/2001 | Holden et al. | 705/37 |
| 2002/0038347 A1 * | 3/2002 | Maeda | 709/206 |
| 2002/0112240 A1 * | 8/2002 | Bacso et al. | 725/47 |

\* cited by examiner

*Primary Examiner*—Quang N. Nguyen
(74) *Attorney, Agent, or Firm*—Oblon, Spivak, McClelland, Maier & Neustadt, P.C.

(57) ABSTRACT

A computer-implemented method and system for sending an electronic message from a sender to an intended recipient based on a time zone of the intended recipient. The time zone of the intended recipient is determined based on, for example, an Internet e-mail domain name. Based on the time zone information of the intended recipient one or more rules, the message is scheduled to be sent at an appropriate time.

2 Claims, 9 Drawing Sheets

| RULE | SCOPE OF RULE | WHEN TO SEND | ON/OFF |
|---|---|---|---|
| 1 | ALL "SEND LATER" E-MAILS | AT LOGOFF | OFF |
| 2 | ALL "SEND LATER" E-MAILS | 7:00 AM LOCAL RECIPIENT | OFF |
| 3 | ALL "SEND LATER" E-MAILS | MIDNIGHT LOCAL SENDER | OFF |
| 4 | ALL "SEND LATER" E-MAILS | SEND + 2 HOURS | OFF |
| 5 | ALL INTERNATIONAL E-MAILS | AT LOGOFF | OFF |
| 6 | ALL INTERNATIONAL E-MAILS | 7:00 AM LOCAL RECIPIENT | OFF |
| 7 | ALL INTERNATIONAL E-MAILS | MIDNIGHT LOCAL SENDER | ON |
| 8 | ALL INTERNATIONAL E-MAILS | SEND + 2 HOURS | OFF |
| 9 | ALL OUT OF TIME ZONE E-MAILS | 7:00 AM LOCAL RECIPIENT | OFF |
| 10 | ALL OUT OF TIME ZONE E-MAILS | MIDNIGHT LOCAL SENDER | OFF |
| 11 | ALL OUT OF TIME ZONE E-MAILS | MIDNIGHT LOCAL SENDER | OFF |
| 12 | ALL OUT OF TIME ZONE E-MAILS | SEND + 2 HOURS | OFF |

| RULE | SCOPE OF RULE | WHEN TO SEND | ON/OFF |
|---|---|---|---|
| 1 | ALL "SEND LATER" E-MAILS | AT LOGOFF | OFF |
| 2 | ALL "SEND LATER" E-MAILS | 7:00 AM LOCAL RECIPIENT | OFF |
| 3 | ALL "SEND LATER" E-MAILS | MIDNIGHT LOCAL SENDER | OFF |
| 4 | ALL "SEND LATER" E-MAILS | SEND + 2 HOURS | OFF |
| 5 | ALL INTERNATIONAL E-MAILS | AT LOGOFF | OFF |
| 6 | ALL INTERNATIONAL E-MAILS | 7:00 AM LOCAL RECIPIENT | OFF |
| 7 | ALL INTERNATIONAL E-MAILS | MIDNIGHT LOCAL SENDER | ON |
| 8 | ALL INTERNATIONAL E-MAILS | SEND + 2 HOURS | OFF |
| 9 | ALL OUT OF TIME ZONE E-MAILS | 7:00 AM LOCAL RECIPIENT | OFF |
| 10 | ALL OUT OF TIME ZONE E-MAILS | MIDNIGHT LOCAL SENDER | OFF |
| 11 | ALL OUT OF TIME ZONE E-MAILS | MIDNIGHT LOCAL SENDER | OFF |
| 12 | ALL OUT OF TIME ZONE E-MAILS | SEND + 2 HOURS | OFF |

FIGURE 4

PRIOR ART

| E-MAIL | SENT | RECIPIENT | SCHEDULED SEND TIME |
|---|---|---|---|
| 1 | SEP-22-2002; 09:18:18 | TO: JOHN.DOE@COMPANY.JP | SEP-23-2002; 00:00:00 |
| 24 | SEP-22-2002; 11:28:34 | TO: JOHN.DOE@COMPANY.JP | SEP-23-2002; 00:00:00 |
| 65 | SEP-22-2002; 16:43:09 | TO: JOHN.DOE@COMPANY.JP | SEP-23-2002; 00:00:00 |
| 123 | SEP-22-2002; 20:05:04 | TO: JOHN.DOE@COMPANY.JP | SEP-23-2002; 00:00:00 |

SYSTEM AND METHOD FOR SENDING ELECTRONIC MESSAGES BASED ON TIME ZONE INFORMATION

CROSS-REFERENCE TO RELATED APPLICATIONS

This application is a continuation of and is based upon and claims the benefit of priority under 35 U.S.C. § 120 for U.S. Ser. No. 10/323,833, filed Dec. 20, 2002, now U.S. Pat. No. 7,216,146, the entire contents of which is incorporated herein by reference.

BACKGROUND OF THE INVENTION

1. Field of the Invention

The present invention relates to a system, method, and computer program product for sending electronic messages based on time zone information.

2. Discussion of the Background

The growth of the Internet has been instrumental in the globalization of many businesses. Along with the Internet has come the explosion of electronic mail (e.g., Internet e-mail) as a preferred method of business communication. Its widespread availability and desktop convenience has made e-mail more and more popular as compared to mail, overnight courier, facsimile, and even telephonic communication.

As more and more businesses have become international or global, it has become necessary to adjust to the necessary inconveniences that arise from conducting business during different hours of the day. For example, it is often difficult to arrange for conference calls when participants are in different time zones around the globe. As another example, when a document is sent via facsimile to a recipient that is not yet in the office, it is sometimes impossible to verify that the document has been received prior to the end of the business day for the sender of the document.

One result of the global business world is the increased use of communication techniques that do not require contemporaneous participation. Examples of these include the facsimile, voice mail, and to a much greater extent electronic messaging such as Internet e-mail.

SUMMARY OF THE INVENTION

The present inventors have recognized that using electronic messaging such as Internet e-mail can provide an advantage over more conventional communication techniques in a global business world. In particular, the present inventors have recognized that electronic messages can be sent based on time zone information of the recipient of the message.

The inventors of the present invention have recognized that by sending electronic messages based on the business day of the sender, or the business day of the recipients of a communication, advantages such as recalling obsolete or embarrassing messages can be realized.

Accordingly, one object of the present invention is to provide an electronic messaging system, method, and computer program product through which electronic messages can be sent based on time zone information of the sender or recipient of the message.

The above described and other objects are addressed by the present invention which provides a novel computer-implemented system, method, and computer program product for sending electronic messages based on time zone information. In one embodiment, the invention is implemented as system that uses Internet domain name information for determining a time zone of a recipient and sends a message at a time based on one or more rules.

Consistent with the title of this section, the above summary is not intended to be an exhaustive discussion of all the features or embodiments of the present invention. A more complete, although not necessarily exhaustive, description of the features and embodiments of the invention is found in the section entitled "DETAILED DESCRIPTION OF THE PREFERRED EMBODIMENTS."

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
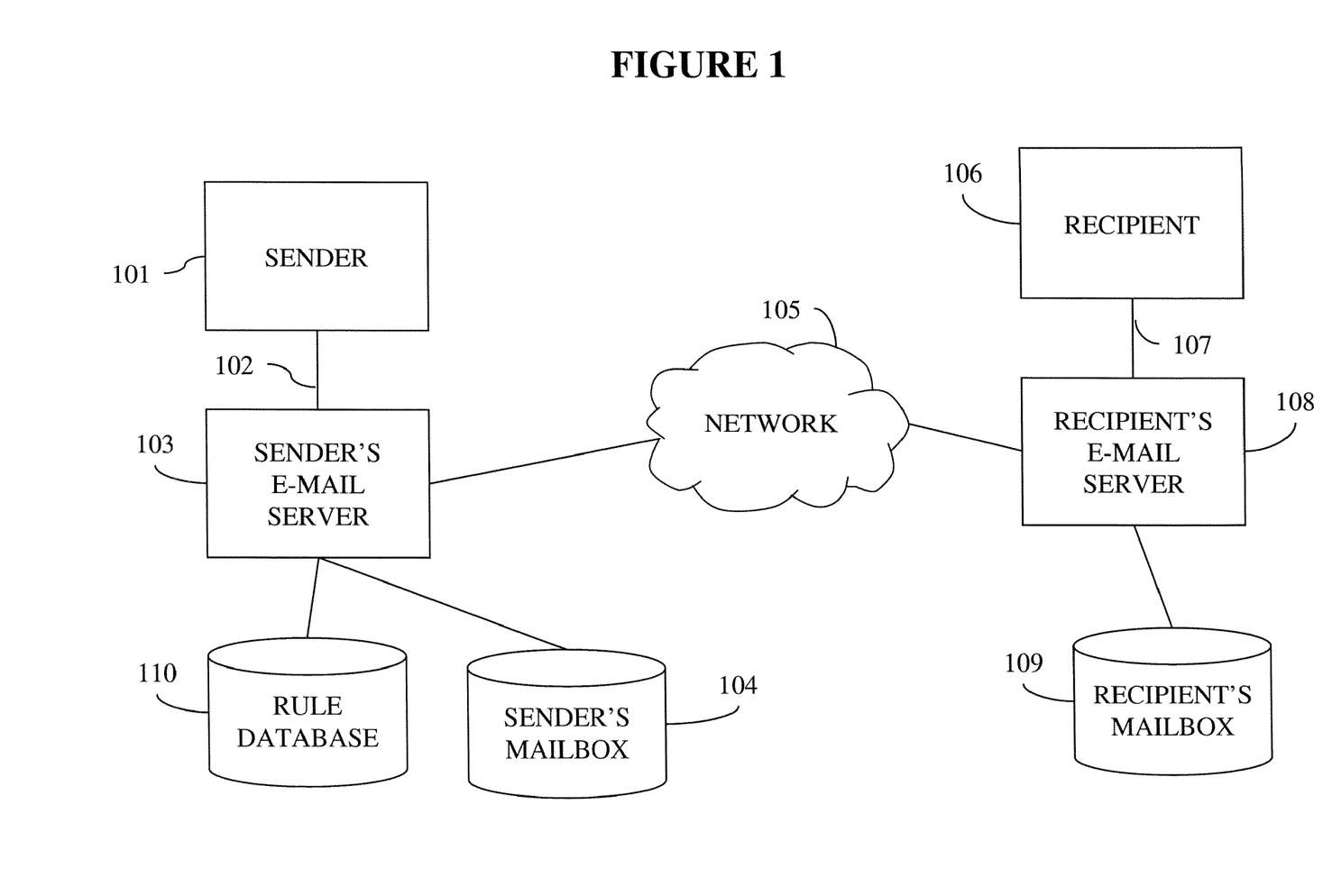
FIG. 1 is a block diagram showing an overall system configuration according to one embodiment of the present invention.

Referring now to the drawings, wherein like reference numerals designate identical or corresponding parts throughout the several views, and more particularly to FIG. 1 thereof, which is a block diagram showing an overall system configuration for one embodiment of the present invention. As shown in FIG. 1, the system includes a sender 101 and a recipient 106 that communicate with each other via a network 105.

Figure 9:
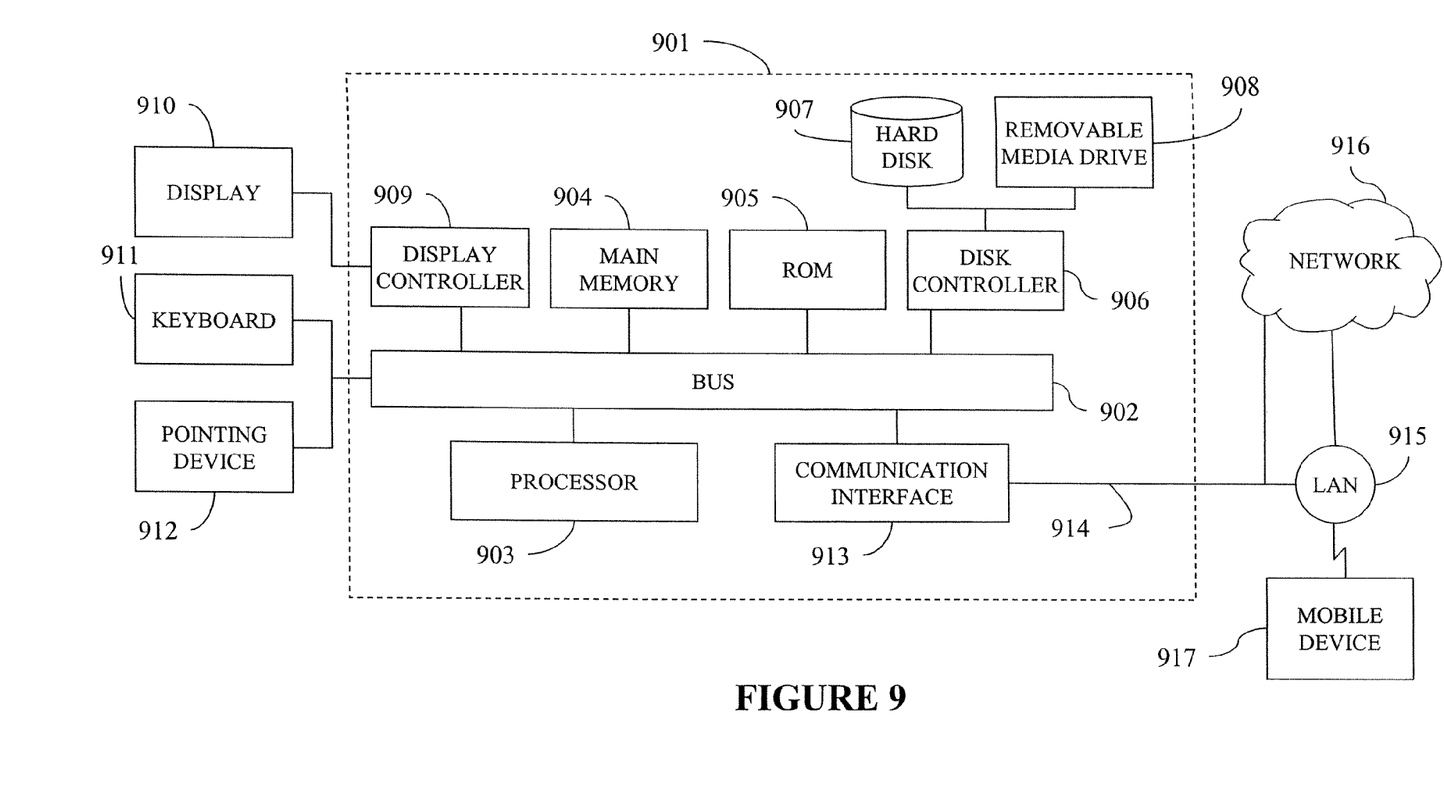
FIG. 9 is an exemplary computer system programmed to perform one or more of the special purpose functions of the present invention.

The sender 101 is implemented using the computer system 901 of FIG. 9, for example, but also maybe any other suitable personal computer (PC), workstation, server, or device for accessing the sender's e-mail server 103 via the communication link 102. The sender 101 includes electronic messaging software that allows the sender 101 to compose, send, and/or receive and read electronic messages sent through the network 105. In one embodiment of the present invention, the electronic messaging software is, for example, a commercially available e-mail software system such as, for example, MICROSOFT's OUTLOOK, NOVELL's GROUPWISE, or other e-mail software applications for sending and receiving electronic messages, such as Internet e-mail through the Internet.

The sender's e-mail server 103 is implemented using the computer system 901 of FIG. 9, for example, but also may be any other suitable personal computer (PC), workstation, server, or device for communicating with the sender 101 via the link 102, and for sending and receiving e-mail via the network 105.

The sender's e-mail server 103 is responsible for managing the sender's 101 e-mail. In an e-mail system, as would be understood by those of ordinary skill in the art, the e-mail server is responsible for maintaining a mailbox (e.g., sender's mailbox 1040 that includes messages that are to be sent from the sender 101 via the network 105, and messages that are received for the sender 101 via the network 105. A more detailed description of how e-mail works is provided in Gralla, P., "How the Internet Works," Que, Millennium Edition, August 1999, Chapter 17: How e-mail Works, pp. 84-103, the entire contents of which are incorporated herein by reference.

For the purposes of this description, the recipient 106, the link 107, the recipient's e-mail server 108, and the recipient's mailbox 109 are similar in function and implementation to the sender 101, link 102, sender's e-mail server 103, and sender's mailbox 104, respectively. Of course, any number of configurations are possible and can communicate with one another if the protocols and standards defining the communications are complied with.

The system shown in FIG. 1 is of course a simplified exemplary system highlighting only certain functional aspects of an electronic messaging system. As would be understood by those of ordinary skill in the relevant arts, a typical system would be much more complex. As an example, in a typical configuration, an e-mail server would manage e-mail for many senders/recipients. Furthermore, in an embodiment where the network 105 is the Internet, the e-mail servers 103, 108 would transfer messages between one another through, for example, internal routers and/or Internet routers and gateways. It should be understood that the present invention is in no way limited to any particular network, communication, or software configuration. However, the present invention is most easily understood in the context of sending and receiving e-mail via the Internet. Therefore, the remainder of this document is written in terms of an embodiment of the present invention implemented for use in an Internet e-mail system.

The rule database 110 is a digital repository that may be implemented, for example, through a commercially available relational database management system (RDBMS) based on the structured query language (SQL) such as, for example, ORACLE, SYBASE, INFORMIX, DB/2 or MICROSOFT SQL SERVER, through an object-oriented database management system (ODBMS), or through custom database or information management software. In one embodiment of the present invention, the rule database contains various rules set up by the sender 101 that are used by the sender's e-mail server 103 to impact when certain e-mail messages should be transferred from the sender's mailbox 104 by the sender's e-mail server 103 via the network 105 to the recipient's e-mail server 108 based on, for example, time zone information of the recipient 106.

As an example, the rule database 110 may include a rule that all e-mails sent by the sender 101 should be transferred from the sender's mailbox 104 by the sender's e-mail server 103 via the network 105 at a time when it is, for example, 7:00 a.m. local time for the recipient 106. Based on that rule maintained in the rule database 110, the sender's e-mail server 103 would wait for the appropriate hour prior to retrieving the message from the mailbox 104 and transferring it to the recipient's e-mail server 108 via the network 105 (e.g., the Internet).

Figure 2:
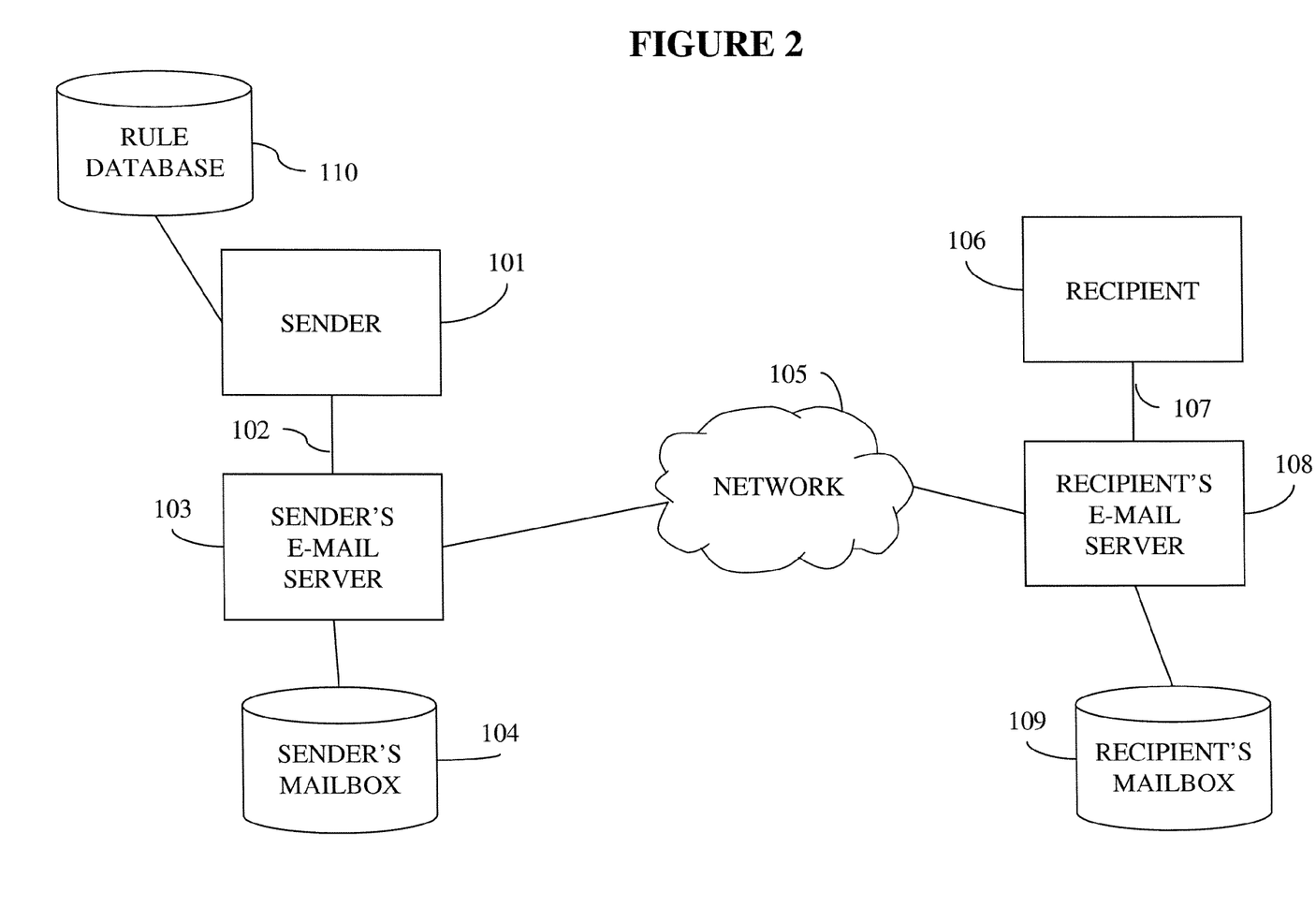
FIG. 2 is a block diagram showing an overall system configuration for another embodiment of the present invention.

FIG. 2 is a block diagram showing an overall system configuration according to a second embodiment of the present invention. As shown in FIG. 2, all of the elements of the system are the same as that shown in FIG. 1, however, in the embodiment illustrated in FIG. 2, the rule database 110 is accessed by software running on the sender 101 rather than on the sender's e-mail server 103. Other than this difference, the operation of the system is the same as shown in FIG. 1. Of course, as would be understood by those of ordinary skill in the software and communications arts, other variations too numerous to list here are possible while remaining true to the present invention.

Figure 3:
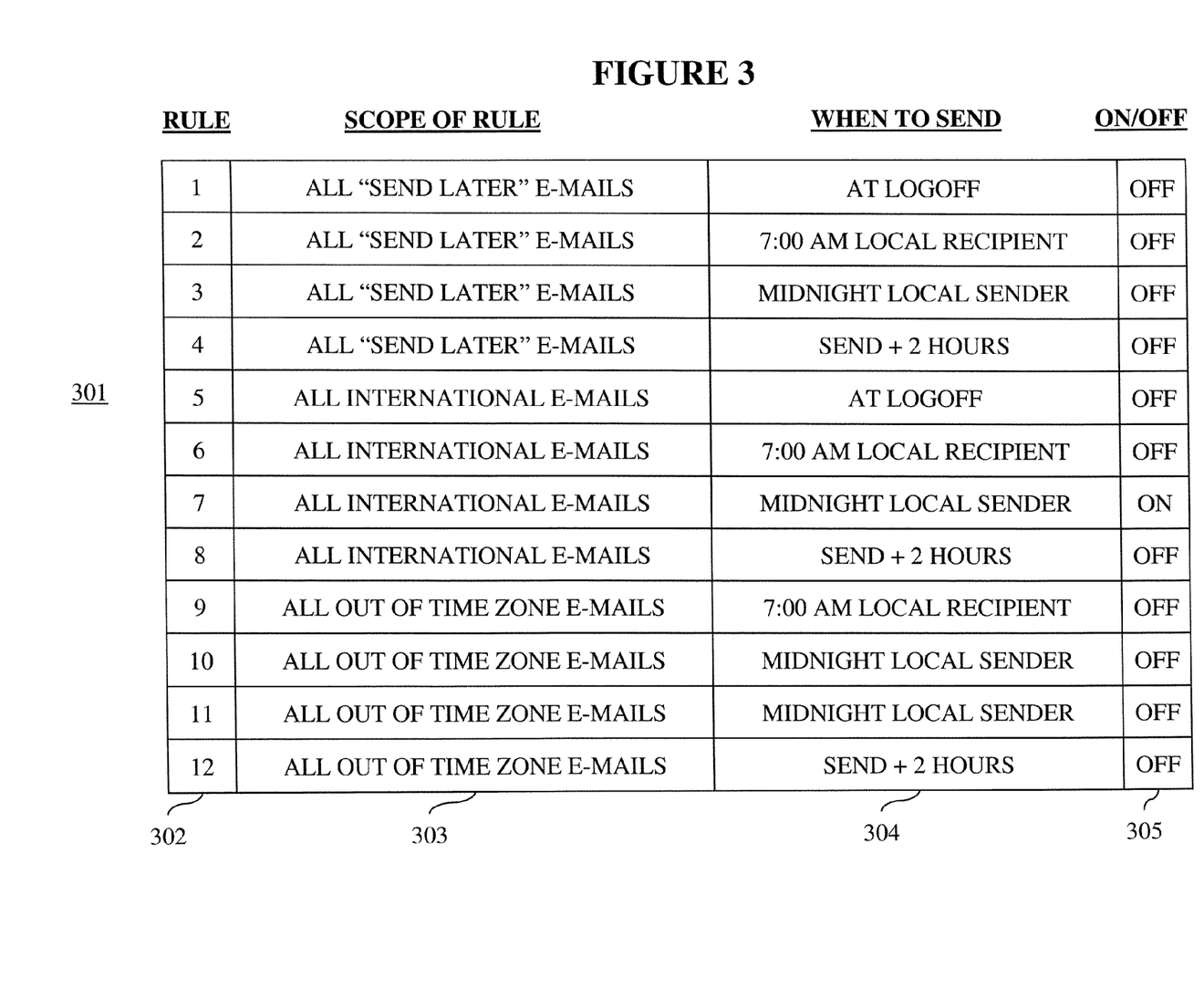
FIG. 3 illustrates an exemplary database structure for information maintained in a rule data base according to one embodiment of the present invention.

FIG. 3 shows an exemplary database structure 301 for maintaining rule information in the rule database 110 according to one embodiment of the present invention. As shown in FIG. 3, in this exemplary structure, the rule database includes rule identifier information 302, information relating to the scope of the rule 303, timing information 304, and an indicator as to whether the rule is presently enabled or disabled 305. The rule identifier information 302 is simply used to uniquely identify a particular rule within the rule database 110. The scope of the rule information 303 is used to identify which e-mails will be subject to the particular rule.

For example, in one embodiment of the present invention, a sender 101 can categorize e-mails as "send later" e-mails. A "send later" e-mail is an e-mail that is to be subjected to the rules that are enabled within the rule database 110 for a particular sender 101. The timing information 304 specifies when e-mails falling within the scope of the rule 303 should be sent from the sender's mailbox 104. In one exemplary rule, all "send later" e-mails may be sent at 7:00 a.m. local time for the particular recipient 106 of the e-mail. In another rule, all international e-mails may be sent when the sender 101 logs off. As would be understood by those of ordinary skill in the software art, any number of rules may be defined based on a particular users needs.

Also shown in the exemplary data structure of FIG. 3 is an on/off column 305 indicating that a sender 101 may have many rules available for selection from the rule database 110, however, only a subset of those rules may be enabled for that particular sender 101 at any given time. As would be also understood by those of ordinary skill in the software art, the rule database 110 may be generic to the sender's e-mail server 103, and the senders 101 may individually configure the operation of their e-mail by enabling and disabling particular rules specific to their desires. As would be understood, FIG. 3 has been simplified to convey the features of the invention while not showing the complexities of any particular implementation.

Figure 4:
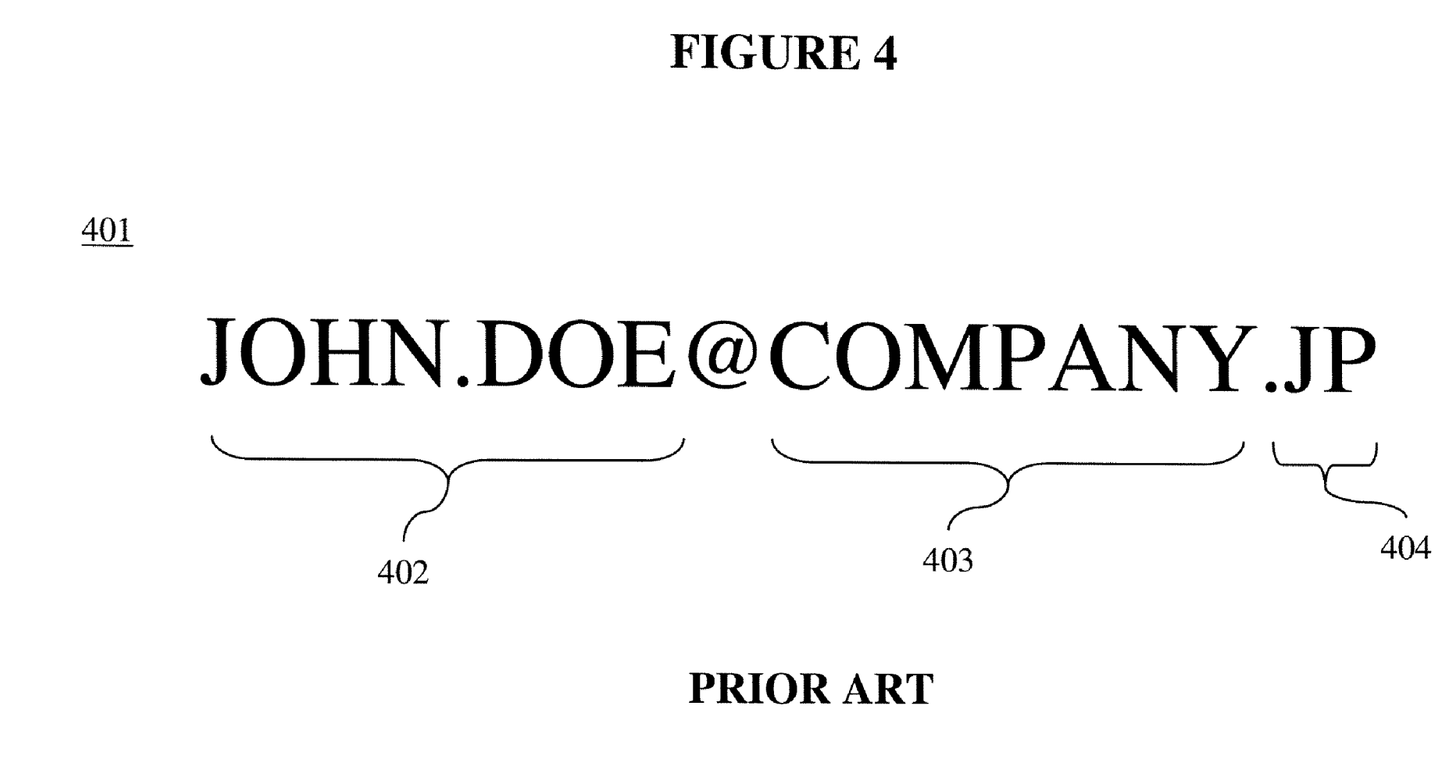
FIG. 4 illustrates the elements of a known exemplary electronic mail message address.

FIG. 4 illustrates the elements of a known electronic message address. As shown in FIG. 4, an Internet address 401 includes a username portion 402, a hostname portion 403, and a domain name portion 404. Of particular interest in the present invention, is the domain name portion 404. As is understood by those of ordinary skill in the software art, the Internet address scheme is based on the Domain Name System (DNS). The DNS has adopted a scheme whereby the domain name portion of an Internet address includes information that directly or indirectly relates to a geographic location of the addressee's domain. As will be described in more detail below, it was the present inventors that recognized that the information contained in or derived from an electronic message address (e.g., an Internet address domain name), could be used to drive a rule-based system allowing a sender to optionally send international electronic messages at different times based on the recipient's local time. A more detailed description of Internet addresses and DNS is provided in Gralla, P., "How the Internet Works," Que, Millennium Edition, August 1999, Chapter 4: Understanding Internet Addresses and Domains, pp. 16-19, the entire contents of which are incorporated herein by reference. While the present invention will be described herein in the context of an Internet addressing scheme, the inventive features are in no way limited to any particular electronic message addressing scheme.

Figure 5:
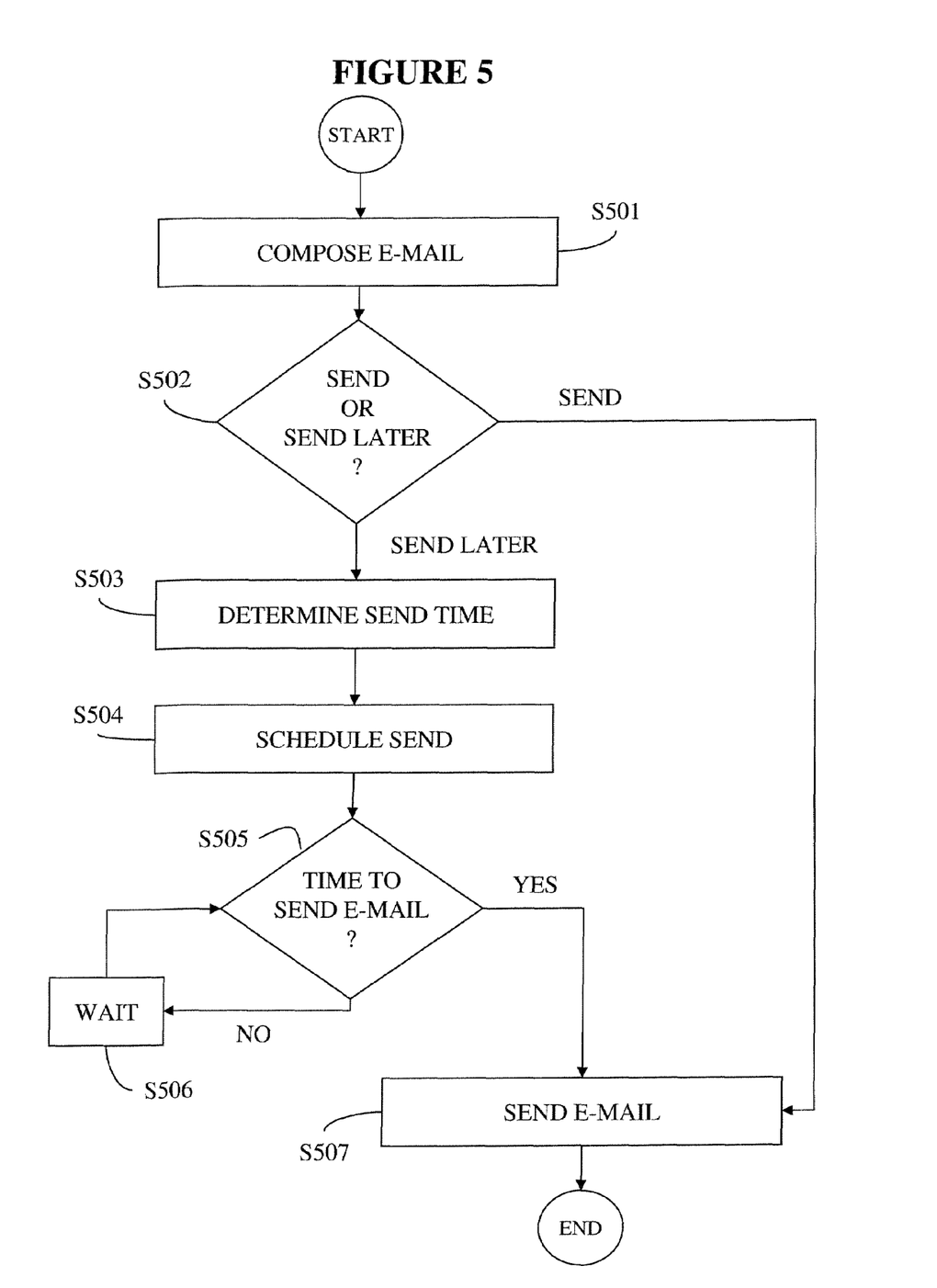
FIG. 5 is a flow diagram showing an exemplary process for sending electronic messages according to rules based on a time zone of a recipient according to one embodiment of the present invention.

FIG. 5 is a flow diagram illustrating a process through which certain e-mails are sent by a sender 101 immediately, and other e-mails are sent by the sender 101 at a time determined based on rules that have been defined and enabled for a particular sender 101. As shown in FIG. 5, the process begins at step S501 where the sender 101 composes an e-mail. The process than proceeds to step S502 where the sender 101 specifies whether to "send" or "send later" the e-mail. If the sender 101 decides to "send" the e-mail (i.e., "send" at step S502), the process proceeds to step S507 where the e-mail is sent, meaning that it is transferred by the sender's e-mail server 103 to the network 105 for sending to the recipient 106. If, on the other hand, the sender 101 decides to "send later" the e-mail (i.e., "send later" at step S502), the process proceeds to step S503 where the sender's e-mail server 103 will determine a send time for the e-mail based on the enabled rules from the rule database 110 for this particular sender 101. Fox example, based on the recipient's 106 e-mail address and an enabled rule specifying that all international e-mails are to be sent at 7:00 a.m. local time for the recipient, the sender's e-mail server 103 may determine that the message should be transferred by the sender's e-mail server 103 to the network 105 at midnight local time for the sender 101. Once the send time has been determined, the process proceeds to step S504 where the e-mail message is scheduled for sending based on its determined send time. The process than proceeds to step S505 where it is determined whether it is time to send the e-mail message. If it is determined that it is now time to send the e-mail message (i.e., "yes" at step S505), the process proceeds to step S507 where the e-mail is sent (i.e., transferred by the senders e-mail server 103 to the recipients e-mail server 108 via the network 105). If, on the other hand, it is determined that it is not yet time to send the e-mail message (i.e., "no" at step S505), the process proceeds to step S506 where the sender's e-mail server 103 will wait until the appropriate time arrives. Once the e-mail message has been sent at step S507 the process ends.

Figure 6:
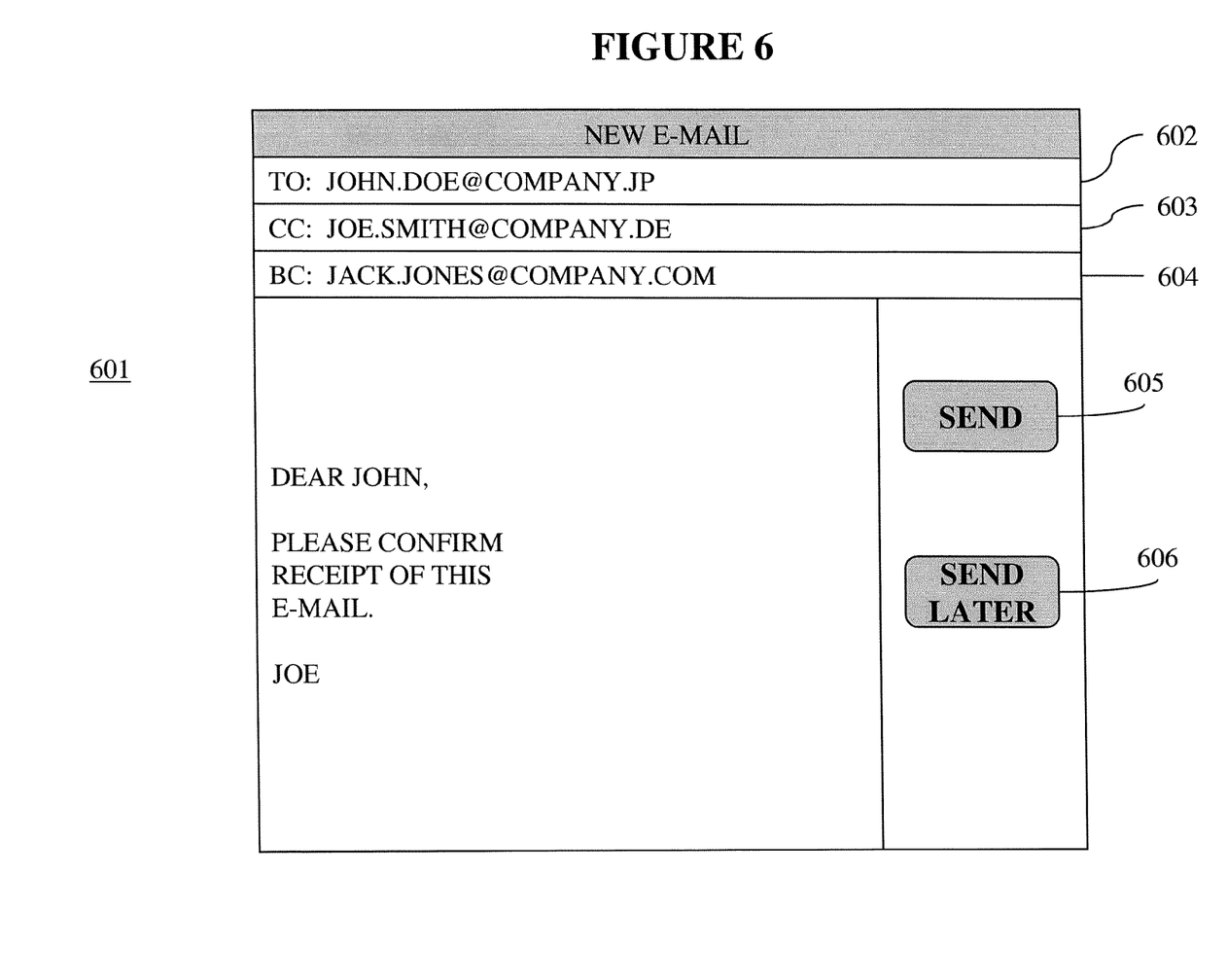
FIG. 6 is an exemplary user interface for sending electronic messages according to rules based on time zone of a recipient according to one embodiment of the present invention.

FIG. 6 shows an exemplary user interface for implementing the features of the present invention according to one embodiment. FIG. 6 is an exemplary window 601 of a graphical user interface of an e-mail application in which a sender 101 may compose an e-mail message. The window includes a TO: line 602, a cc: line 603, a bc: line 604, a SEND button 605, and a SEND LATER button 606.

In the example shown in FIG. 6, the e-mail message has been composed and addressed to an individual having a Japanese e-mail address as indicated by the '.jp' in the domain name portion of the recipient's e-mail address. The same e-mail has been cc'ed to an individual having a German e-mail address ('.de'), and bc'ed to an individual having a United Stated e-mail address ('.com'). In one embodiment of the present invention, the e-mail editor includes a SEND button 605 and a SEND LATER button 606. In this embodiment, the sender 101 may simply send the e-mail by selecting the SEND button 605 which will cause the sender's e-mail server 103 to simply transfer the e-mail message to the network 105 and on to the appropriate recipients 106.

If, on the other hand, the SEND LATER button 606 is selected, the sender's e-mail server 103 will access the rule database 110 to determine which rules have been implemented for this particular sender 101. Once the sender's e-mail server 103 determines which rules to impose, the e-mail message is processed based on each of the recipients so that the appropriate send time(s) may be determined. After the send time has been determined, as described in the context of FIG. 4, the sender's e-mail server 103 schedules the send time for the various recipients. In one embodiment of the present invention, rules may be defined such that once the send times have been determined, all recipients of the e-mail message will receive the message at the same time, that time being, for example, the earliest of the send times determine for the e-mail message. In this way, the rules can still be used, however, all recipients will receive the e-mail message at the same time.

Figure 7:
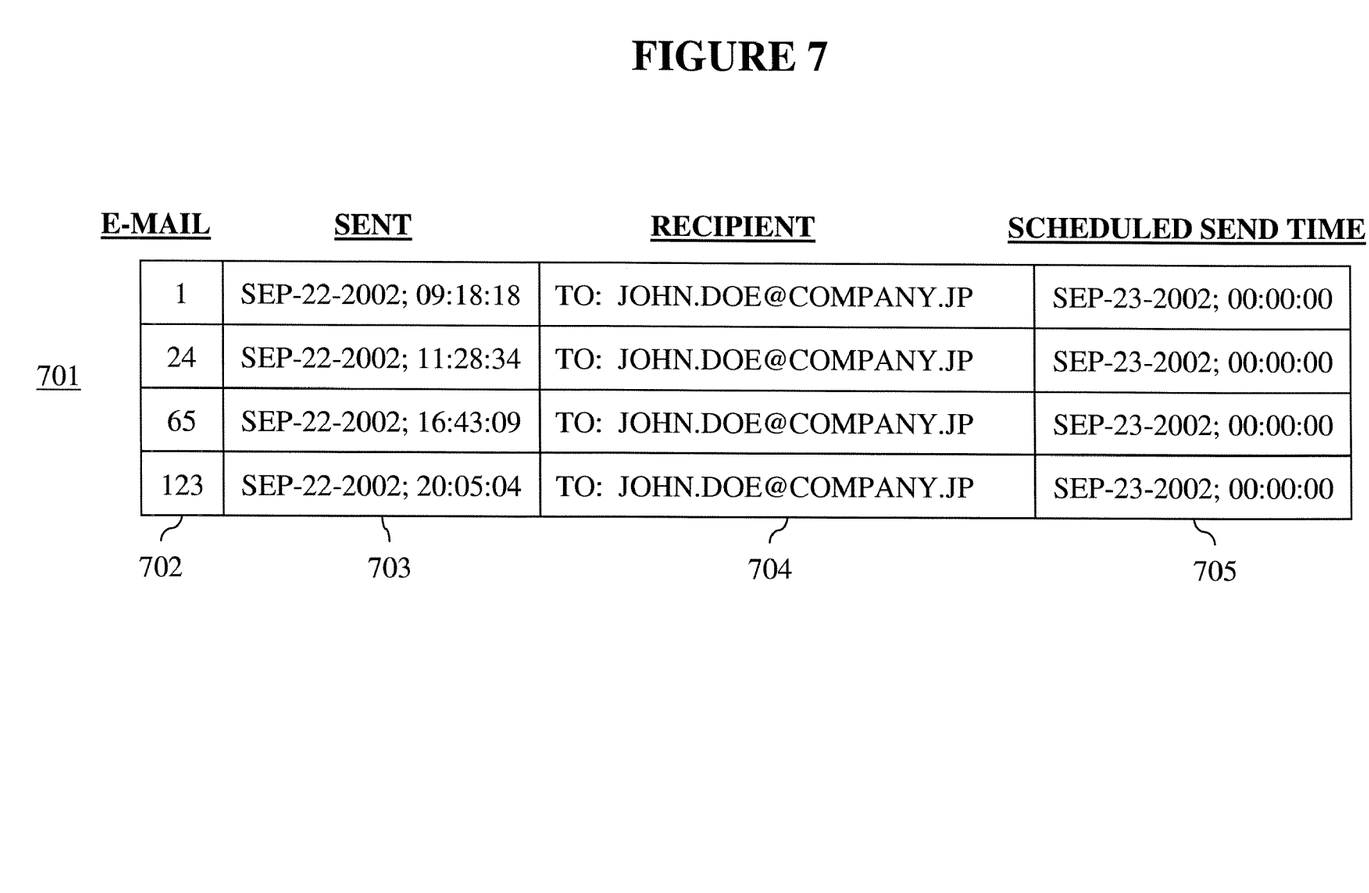
FIG. 7 illustrates exemplary items maintained in electronic message mailbox according to one embodiment of the present invention.

FIG. 7 illustrates exemplary entries 701 from a sender's mailbox 104. As shown in FIG. 7, information maintained in the sender's mailbox 104 may include an e-mail message identifier 702, a sent time 703 indicating when the sender 101 either "SENT" or "SENT LATER" the e-mail message, recipient information 704, and a scheduled send time for the e-mail 705. The example shown in FIG. 7 illustrates that messages 1, 24, 65, and 123 may have been "SENT LATER" throughout the day by the sender 101, as indicated by the sent time 703. However, based on the rules implemented for this particular sender 101 in the rule database 110, the sender's e-mail server 103 has scheduled each of these e-mails to be sent to the recipient at midnight local time as indicated in the scheduled send time 705.

It was the inventors of the present invention that recognized by imposing the appropriate rules, e-mails may be withdrawn during the sender's 101 workday, which can, for example, save the recipient 106 from receiving messages having content that was superceded by messages sent later on in the day. The present invention allows a sender 101 to simply recall obsolete, superceded, or potentially embarrassing e-mail messages prior to ending his business day.

Figure 8:
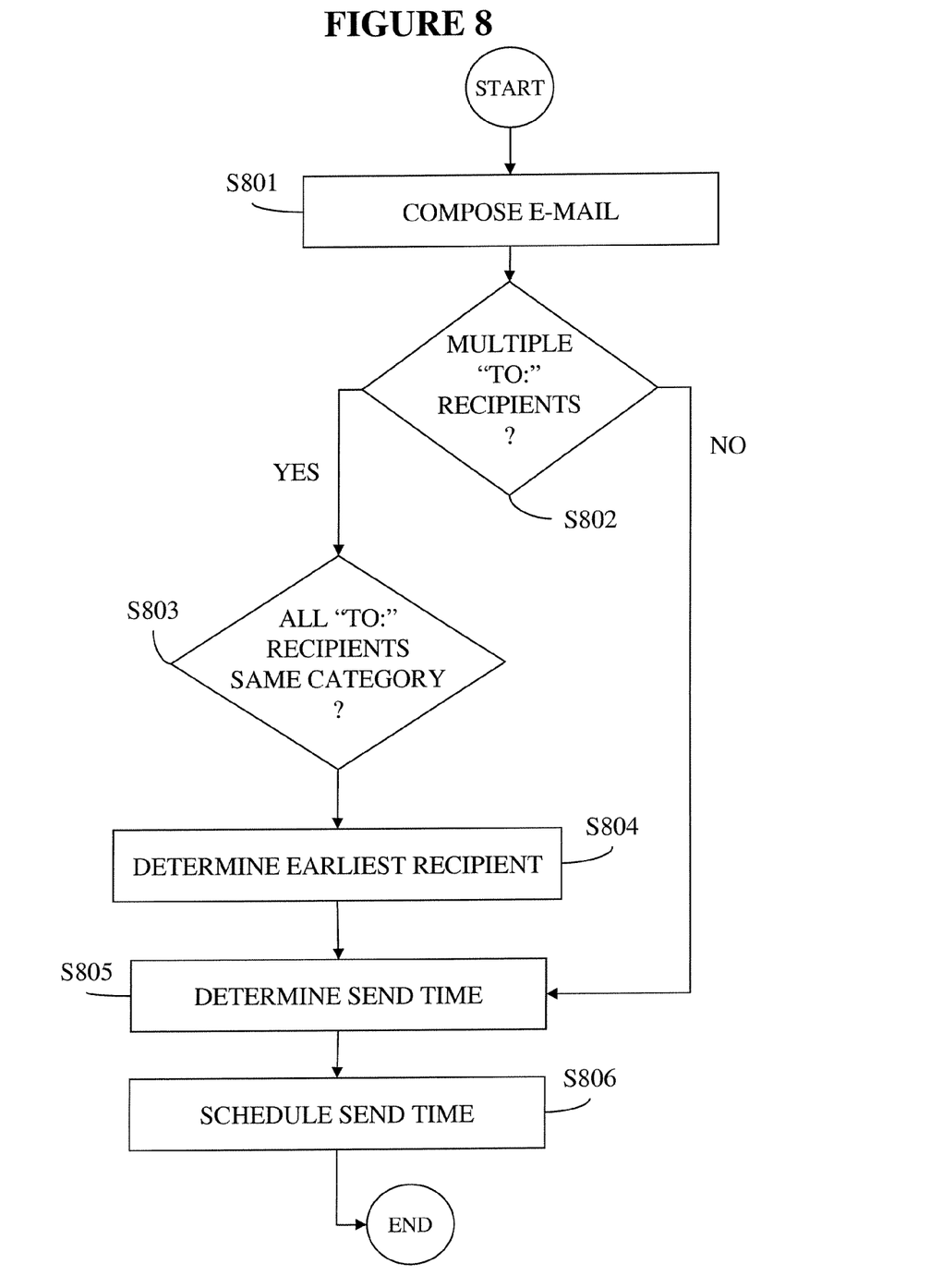
FIG. 8 is a flow diagram showing an exemplary process for determining when to send messages from an electronic message mailbox according to one embodiment of the present invention.

FIG. 8 is a flow chart illustrating an exemplary scheduling process performed by the sender's e-mail server 103 according to one embodiment of the present invention. As shown in FIG. 8, the process begins with step S801 where the sender 101 composes an e-mail. The process then proceeds to step S802 where the sender's e-mail server 103 determines whether there are multiple "TO:" recipients. If it is determined that there are not multiple "TO:" recipients (i.e., "no" at step S802, the process proceeds to step S805 where the single "TO:" recipient's send time is determined. If, on the other hand, it is determined that there are multiple "TO:" recipients (i.e., "yes" at step S802), the process proceeds to step S803 where the sender's e-mail server 103 determines whether all "TO:" recipients are within the same category. The process then proceeds to step S804 where, based on the determination made at step S803, the earliest recipient is determined. In other words, if the recipients include an individual in Japan and an individual in Germany, the Japanese recipient would be the earliest recipient. The process then proceeds to step S805 where, based on the enabled rules for the particular sender 101, the sender's e-mail server 103 determines the send time for the earliest recipient. Once the send time has been determined, the process proceeds to step S806 where the e-mail message is scheduled to be sent at that send time. Once the e-mail has been scheduled for sending, this process ends.

As would be understood by those of the ordinary skill in the software art, countless variations of scheduling algorithms may be developed while keeping true to the teachings of the present invention. The present invention is in no way limited to any one implementation or to the particular algorithms described herein.

FIG. 9 illustrates a computer system 901 upon which an embodiment of the present invention may be implemented. The present invention may be implemented on a single such computer system, or a collection of multiple such computer systems. The computer system 901 includes a bus 902 or other communication mechanism for communicating information, and a processor 903 coupled with the bus 902 for processing the information. The computer system 901 also includes a main memory 904, such as a random access memory (RAM) or other dynamic storage device (e.g., dynamic RAM (DRAM), static RAM (SRAM), and synchronous DRAM (SDRAM)), coupled to the bus 902 for storing information and instructions to be executed by processor 903. In addition, the main memory 904 may be used for storing temporary variables or other intermediate information during the execution of instructions by the processor 903. The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 901 may also include a display controller 909 coupled to the bus 902 to control a display 910, such as a cathode ray tube (CRT), for displaying information to a computer user. The computer system includes input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of the data structures/information shown in FIGS. 3 and 6, or any other data stored and/or generated by the computer system 901.

The computer system 901 performs a portion or all of the processing steps of the invention in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 901, for driving a device or devices for implementing the invention, and for enabling the computer system 901 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 903 for execution. A computer readable medium may take many forms, including but not limited to, non-volatile media, volatile media, and transmission media. Non-volatile media includes, for example, optical, magnetic disks, and magneto-optical disks, such as the hard disk 907 or the removable media drive 908. Volatile media includes dynamic memory, such as the main memory 904. Transmission media includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 901 may receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a network interface card to attach to any packet switched LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local network 915 (e.g., a LAN) or through equipment operated by a service provider, which provides communication services through a communications network 916. In preferred embodiments, the local network 914 and the communications network 916 preferably use electrical, electromagnetic, or optical signals that carry digital data streams. The signals through the various networks and the signals on the network link 914 and through the communication interface 913, which carry the digital data to and from the computer system 901, are exemplary forms of carrier waves transporting the information. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA), laptop computer, or cellular telephone. The LAN communications network 915 and the communications network 916 both use electrical, electromagnetic or optical signals that carry digital data streams. The signals through the various networks and the signals on the network link 914 and through the communication interface 913, which carry the digital data to and from the system 901, are exemplary forms of carrier waves transporting the information. The computer system 901 can transmit notifications and receive data, including program code, through the network(s), the network link 914 and the communication interface 913.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for sending a plurality of electronic Internet e-mail messages from a sender to at least one intended recipient based on a time zone of the at least one intended recipient, comprising the steps of:

determining, for each of a plurality of electronic messages, the time zone of a particular intended recipient of the electronic message based on an Internet e-mail address of the particular intended recipient;

determining, by a message scheduling mechanism, a scheduled send time for each of the plurality of electronic messages based on a predetermined rule related to the time zone of the particular intended recipient;

determining a local time of the sender;

comparing, for each of the electronic messages, the local time of the sender with the scheduled send time;

designating at least one of the plurality of electronic messages for transfer to the particular intended recipient;

delaying transfer of each of the plurality of electronic messages until the local time is equal to the scheduled send time;

prior to said scheduled send time, further designating at least one of the designated electronic messages as a message which is not to be transferred; and transferring at least one of the electronic messages designated for transfer to the particular intended recipient at the scheduled send time.

2. A method for sending a plurality of electronic Internet e-mail messages from a sender to at least one intended recipient based on a time zone of the at least one intended recipient, comprising the steps of:

determining, for each of a plurality of electronic messages, the time zone of a particular intended recipient of the electronic message based on an Internet e-mail address of the particular intended recipient;

determining, by a message scheduling mechanism, a scheduled send time for each of the plurality of electronic messages based on a predetermined rule related to the time zone of the particular intended recipient;

determining a local time of the sender;

comparing, for each of said electronic messages, the local time of the sender with the scheduled time;

designating at least one of the electronic messages for transfer to the particular intended recipient;

delaying transfer of each of the electronic messages for a time period related to a difference between the local time of the sender and the local time at the time zone of the particular intended recipient;

prior to said scheduled send time, further designating at least one of the designated electronic messages as a message which is not to be transferred; and transferring at least one of the designated electronic messages designated for transfer to the particular intended recipient at the scheduled send time.

* * * * *